UNITED STATES PATENT OFFICE.

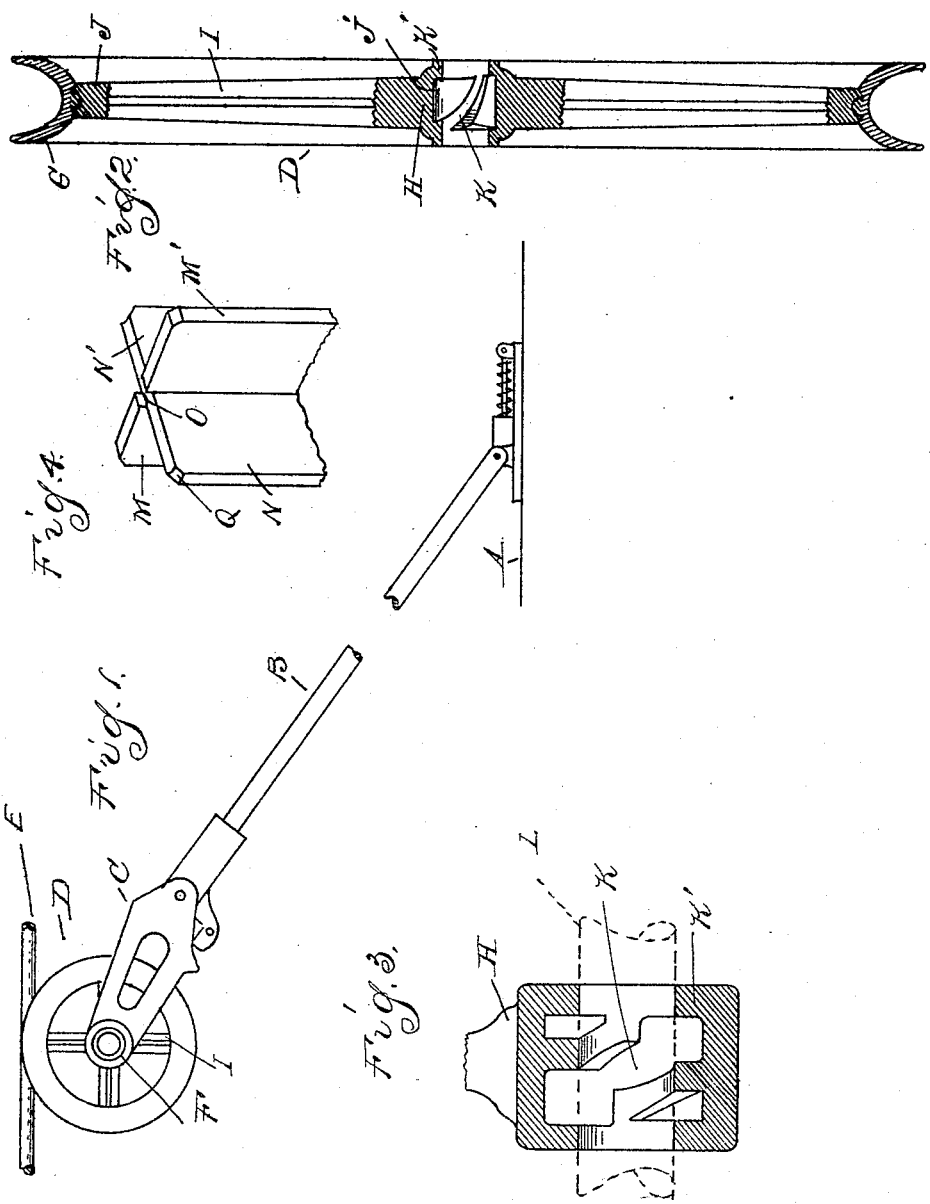

FRANK T. ELWELL, OF LOS ANGELES, CALIFORNIA.

TROLLEY-WHEEL.

1,304,285.     Specification of Letters Patent.     Patented May 20, 1919.

Application filed November 16, 1917. Serial No. 202,319.

*To all whom it may concern:*

Be it known that I, FRANK T. ELWELL, a citizen of the United States of America, residing at Los Angeles, in the county of Los Angeles and State of California, have invented certain new and useful Improvements in Trolley-Wheels, of which the following is a specification, reference being had therein to the accompanying drawings.

This invention relates to trolley wheels and refers more particularly to trolley wheels which are mounted at the end of a relatively long pole or other supporting device.

In the use of trolley wheels of this general character it is necessary that the weight of the trolley wheel which is mounted at the free end of a relatively long pole or supporting device should not exceed a given amount, otherwise difficulty is encountered in maintaining contact between the trolley wheel and the trolley wire. Heretofore this has limited the size of the wheel, and because of the necessarily small wheels employed the excessive rate at which such wheels must turn upon their bearings makes the life of the trolley wheel relatively short. Moreover because of the limited diameter the amount of wearing surface which the wheel presents to the wire is also relatively small.

The present invention therefore contemplates an improved and simple construction whereby a wheel can be employed which will present larger wearing surface and will make fewer revolutions for a given speed of the car, and without increasing the weight at the free end of the trolley pole beyond that of the standard wheel now in use. Other features of the invention reside in the novel construction of the oil-retaining bearing for the hub and in the construction of the spokes and the method of attaching the copper or like metal rim to the spokes.

In the drawings:

Figure 1 is a side elevational view of a trolley pole having a wheel embodying my invention;

Fig. 2 is an enlarged vertical section through the wheel shown in Fig. 1;

Fig. 3 is an enlarged detail view of the hub construction;

Fig. 4 is a perspective view of the end of one of the spokes.

In detail A designates the roof of a trolley car to which there is secured the usual trolley pole B extending diagonally rearwardly and upwardly. At its free end this pole is provided with a trolley harp C carrying a wheel D which contacts with the wire E and receives an electric current therefrom. The wheel D is mounted in suitable bearings F in the harp. In order to present a suitable wearing surface and one which is a good electrical conductor, the rim G of the wheel is formed of copper or other like metals, while the hub portion H, the spokes I and the inner rim J are formed of aluminum or other light weight metal. The copper or other wearing surface rim G is preferably cast or otherwise fixedly secured upon the inner rim J or if preferred the spokes can terminate directly in the outer rim. By this novel arrangement of parts I am enabled to employ, for example, a nine-inch wheel where previously a six-inch wheel was used, and without in any way increasing the total weight at the free end of the trolley pole. Moreover this construction presents about sixty per cent. greater wearing surface so that in addition to increasing the life of the bearings, the life of the wearing surface of the trolley wheel is also increased.

In order to provide proper lubrication for the wheel I have devised a novel construction whereby an oil-receiving chamber or recess J' is formed in the hub portion and a pair of spiral ribs K arranged to extend substantially into alinement with the edge portions K' of the hub. By this construction and arrangement of the spiral or diagonal ribs a supporting surface for the opposite sides of the bearing L is obtained throughout substantially the length of the hub. The spiral ribs not only furnish sufficient pressure against the bearings but also assist in maintaining the proper conductivity through the bearing to the trolley wheel.

In constructing the wheel above described the following method is preferably employed: First the hub and spoke portions H and I are cast or otherwise suitably formed of aluminum or like metal; after which the hub and spoke parts so formed are used as a core and the brass or copper ring cast around the end of the spokes. Naturally as the metal cools it will contract and draw down tightly on to the end of the spokes. Moreover as the melting point of the rim portion is somewhat higher than that of the metal which forms the spokes, the casting of the rim around the hub and spoke parts as a core will fuse the metal at the end of the spokes and allow it to amalgamate sufficiently to form a substantially shorter joint. I preferably regulate the amount of fusing and also secure a better union between the rim and spokes through the novel construction of the latter. As shown in Figs. 2 and 4 the spokes are formed with transverse ribs M and M' and N and N', the latter of which are shorter than the ribs or flanges M and M' so as to form a recess or seat O between the ends of the ribs M and M'. As the metal flows into this recess and sets, it will, of course, form an interlock, and a similar interlock in the opposite direction is obtained by the tapered corners Q and Q' into which the metal flows, to form in effect a locking key. Various changes, however, in the details of the spoke construction and other parts can be made within the scope of my invention.

What I claim as my invention is:—

1. The combination with a relatively long supporting member, of a trolley wheel carried by said supporting member, said trolley wheel having a main body portion of aluminum or the like relatively light material, and a rim portion of heavier material such as copper to provide an adequate wearing surface.

2. A trolley wheel comprising a copper rim portion forming a wear surface and a main body portion of lighter material such as aluminum around which the rim portion is cast, said body portion having parts interlocked with the rim portion.

3. A trolley wheel comprising a rim portion forming a wear surface of material such as copper, and a main body portion of light material such as aluminum comprising a hub and spokes, the ends of said spokes having a fused connection with the rim portion.

4. A trolley wheel, comprising a rim portion forming a wearing surface of material such as copper, and a main body portion of light material such as aluminum, said body and rim portions having a fused connection.

In testimony whereof I affix my signature.

FRANK T. ELWELL.

Copies of this patent may be obtained for five cents each, by addressing the "Commissioner of Patents, Washington, D. C."